(12) United States Patent
Makley et al.

(10) Patent No.: US 8,531,835 B2
(45) Date of Patent: Sep. 10, 2013

(54) METHOD, APPARATUS, AND SYSTEM FOR A LOW PROFILE COMPUTER ADAPTER CARD RETAINER AND LOAD DISTRIBUTION SYSTEM

(75) Inventors: Albert V. Makley, Morrisville, NC (US); Timothy S. Farrow, Cary, NC (US); William F. Martin-Otto, Apex, NC (US); Marc R. Pamley, Durham, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 331 days.

(21) Appl. No.: 12/750,355

(22) Filed: Mar. 30, 2010

(65) Prior Publication Data
US 2011/0242758 A1 Oct. 6, 2011

(51) Int. Cl.
*H05K 5/00* (2006.01)
*H05K 7/00* (2006.01)
*H04M 1/00* (2006.01)

(52) U.S. Cl.
USPC ............ 361/679.58; 361/679.43; 361/679.44; 361/679.02; 455/575.1

(58) Field of Classification Search
USPC .................... 361/681, 683, 679.01, 801, 804, 361/679.29, 679.55, 679.32, 679.43, 6, 79.44, 361/679.58, 679.59, 728–732, 740, 759; 455/575.3, 550.1, 56; 312/223.1, 223.2
See application file for complete search history.

(56) References Cited

U.S. PATENT DOCUMENTS

| | | | |
|---|---|---|---|
| 6,220,887 B1 * | 4/2001 | Downs ......................... | 439/377 |
| 6,870,731 B2 * | 3/2005 | Lin et al. .................. | 361/679.58 |
| 2005/0237712 A1 * | 10/2005 | Li ................................. | 361/687 |
| 2005/0265005 A1 * | 12/2005 | Han et al. ..................... | 361/726 |
| 2010/0271768 A1 * | 10/2010 | Fan et al. .................... | 361/679.4 |

* cited by examiner

*Primary Examiner* — Jayprakash N Gandhi
*Assistant Examiner* — Jerry Wu
(74) *Attorney, Agent, or Firm* — Kunzler Law Group (57) ABSTRACT

A method, apparatus, and system are disclosed for a planar adapter card retainer bracket that is removably attachable to a computer chassis and is formed with a plurality of plunger openings. Each plunger opening is configured to receive a respective adapter card retainer plunger. The adapter card retainer plunger is configured to extend from the bracket into the computer chassis to engage an edge of an adapter card thereby retaining the adapter card in a selected slot even if the adapter card is a low-profile adapter card.

21 Claims, 8 Drawing Sheets

METHOD, APPARATUS, AND SYSTEM FOR A LOW PROFILE COMPUTER ADAPTER CARD RETAINER AND LOAD DISTRIBUTION SYSTEM

BACKGROUND

1. Field

The subject matter disclosed herein relates to retaining computer adapter cards and more particularly relates to retaining low-profile adapter cards within a computer chassis.

2. Description of the Related Art

A computer chassis (sometimes referred to as a computer tower, computer enclosure, or computer case) is an enclosure that houses the main components of a computer such as the motherboard, power supply, adapter cards, disk drives, etc. A computer chassis may come in various sizes and orientations. For example, in some instances a very small chassis may be desired due to space limitations and may be oriented to stand vertically. In other instances, a larger chassis may be desired to enable the addition of more components and may orient horizontally, perhaps to lie beneath a monitor or display device.

Typically, a computer chassis is configured with a number of slot openings, usually at the rear of the chassis, to receive components such as graphics cards, network cards, modem cards, or other types of expansion adapter cards. The slot openings of the computer chassis are configured to line up with expansion slots of the mother board housed by the computer chassis. Thus, the slot openings of the chassis and the expansion slots of the mother board may receive and retain an adapter card in position to communicate with the computer system.

Today, adapter cards are provided in different sizes and configurations to fit into the different sizes and types of computer chassis. For example, some adapter cards are low-profile adapter cards which means they are shorter than standard adapter cards, and thus can fit into a smaller computer chassis than is possible for standard sized adapter cards. A low profile standard has even been defined for PCI cards so that vendors can ensure compatibility between smaller chassis designs and low profile adapter cards. However, even though low profile adapter cards are smaller in size/height, they may still be used with larger chassis designs.

Often with conventional computer systems, the chassis or a chassis cover or wall helps to retain the adapter cards in their installed expansion slot position. For example, the height of a standard card may extend to, or almost to, a chassis cover such that the adapter card cannot move in a direction to disengage from its mother board expansion slot. However, one problem with the conventional art, particularly with the use of low profile adapter cards and even some standard adapter cards, is that they may not reach the chassis wall or may not reach conventional retention mechanisms. Therefore, the adapter cards may become disengaged from the mother board during shipping or handling of the computer chassis.

Another problem with conventional computer systems is that conventional chassis walls and covers do not sufficiently distribute static and dynamic loads from the center of a chassis to the sustaining members that support the chassis and provide it rigidity and protection. For example, if a force was exerted against the side cover of a chassis during shipping, it's likely that the force will be transferred to adapter cards that extend to the chassis wall, rather than to the structural support members of the chassis. This force transfer can result in damage to the adapter cards and even to the mother board or other components.

Another problem found in conventional systems is that installation of adapter cards and the like requires the use of tools such as a screwdriver to secure an adapter card bracket to a computer chassis. The requirement of tools prevents the possibility of tool-less installation and retention of adapter cards that would reduce the difficulty and increase the efficiency of adapter card installation.

SUMMARY

Based on the foregoing discussion, the inventors have recognized a need for a method, apparatus, and system that would solve the unresolved problems of the conventional art described above. The embodiments described herein have been developed in response to the present state of the art, and in particular, in response to the problems and needs in the art that have not yet been fully solved by currently available computer chassis and adapter card retainer mechanisms. Accordingly, embodiments have been developed to provide a method, apparatus, and system for retaining adapter cards that overcome many or all of the above-discussed shortcomings in the art.

The apparatus is provided that includes a planar adapter card retainer bracket that is removably attachable to a chassis and is formed with a plurality of plunger openings. Each plunger opening is configured to receive a respective adapter card retainer plunger. In one embodiment, the adapter card retainer bracket comprises a first end and a second end. The first end has a first set of attachment devices configured to attach the first end of the adapter card retainer bracket to a first side of the chassis. The second end has a second set of attachment devices configured to attach the second end of the adapter card retainer bracket to a second side of the chassis. In a further embodiment, the first set of attachment devices comprises at least one tab extending from the first end of the adapter card retainer bracket and configured to engage a receiving slot formed in the first side of the chassis. In yet a further embodiment, the second set of attachment devices comprises at least one receptor tab extending from the second end of the adapter card retainer bracket and is configured to receive at least one flexible protruding tab from the second side of the chassis. The receptor tab comprises at least one edge configured to lockably engage the flexible protruding tab in a fixed position.

A method is presented for forming an adapter card retainer bracket. In one embodiment, the method includes forming a planar adapter card retainer bracket having a plurality of plunger openings and configured to be removably attachable to a chassis, wherein each plunger opening is configured to receive a respective adapter card retainer plunger.

The method also may include forming a first end and a second end of the adapter card retainer bracket, wherein the first end has a first set of attachment devices configured to attach the first end of the adapter card retainer bracket to a first side of the chassis, and wherein the second end has a second set of attachment devices configured to attach the second end of the adapter card retainer bracket to a second side of the chassis.

A system is also presented. The system may be embodied with a computer chassis, an adapter card installed in the chassis, and an adapter card retainer bracket as described above. In one embodiment, one of the adapter cards may be a low-profile adapter card. Furthermore, the system, in one embodiment, includes an adapter card retainer bracket, removably attachable to the chassis and formed with a plurality of plunger openings. Each plunger opening configured to receive a respective adapter card retainer plunger. The system may also include at least one adapter card retainer plunger. The adapter card retainer plunger comprises a first edge configured to removably attach to a plunger opening of the adapter card retainer bracket and a second edge configured to engage an edge of an adapter card within the chassis.

The various embodiments will become more fully apparent from the following description and appended claims, or may be learned by the practice of the embodiments as set forth hereinafter.

BRIEF DESCRIPTION OF THE DRAWINGS

In order that the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

References throughout this specification to features or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

Figure 1:
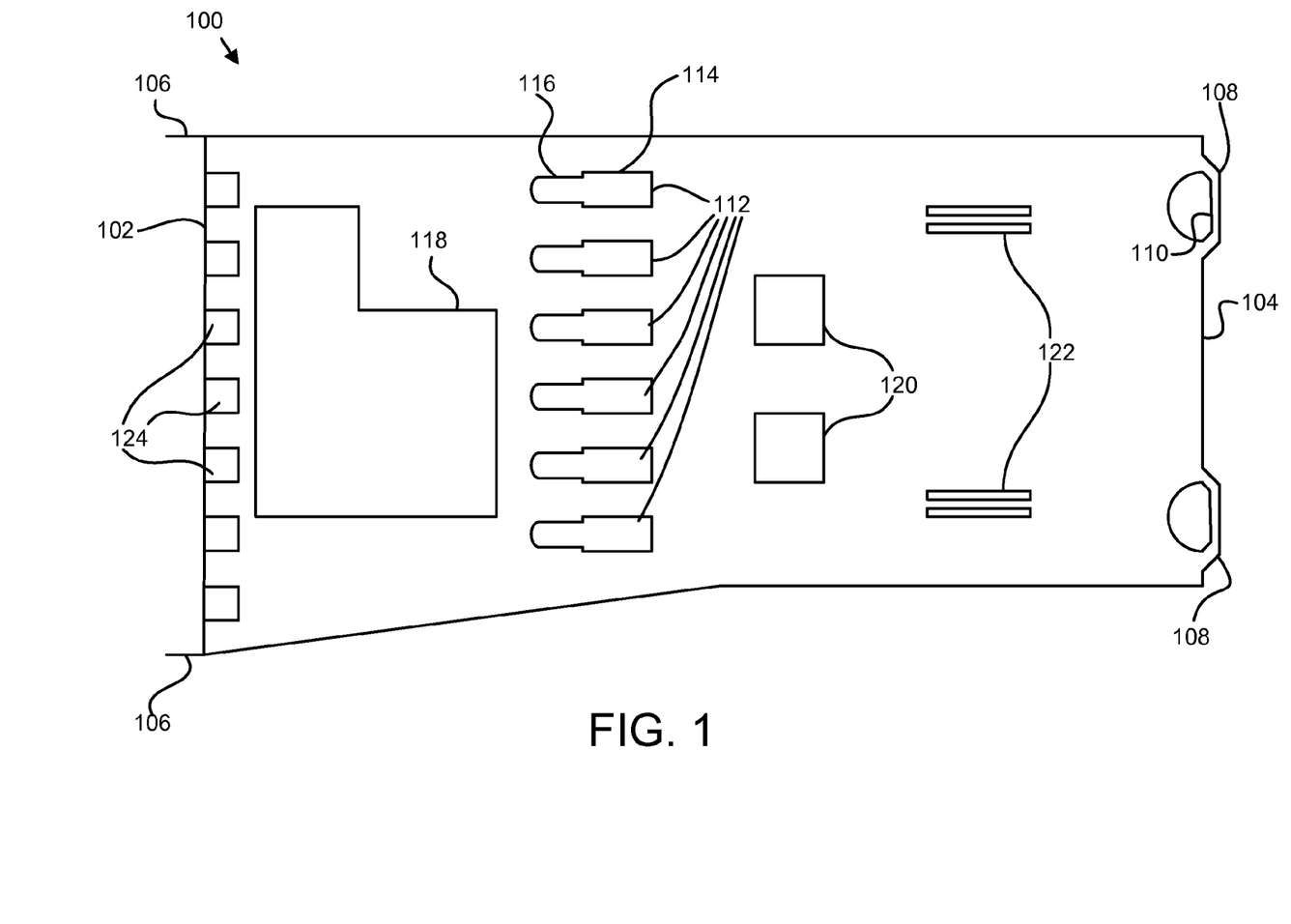
FIG. 1 is a side view illustrating one embodiment of an adapter card retainer bracket.
Figure 2:
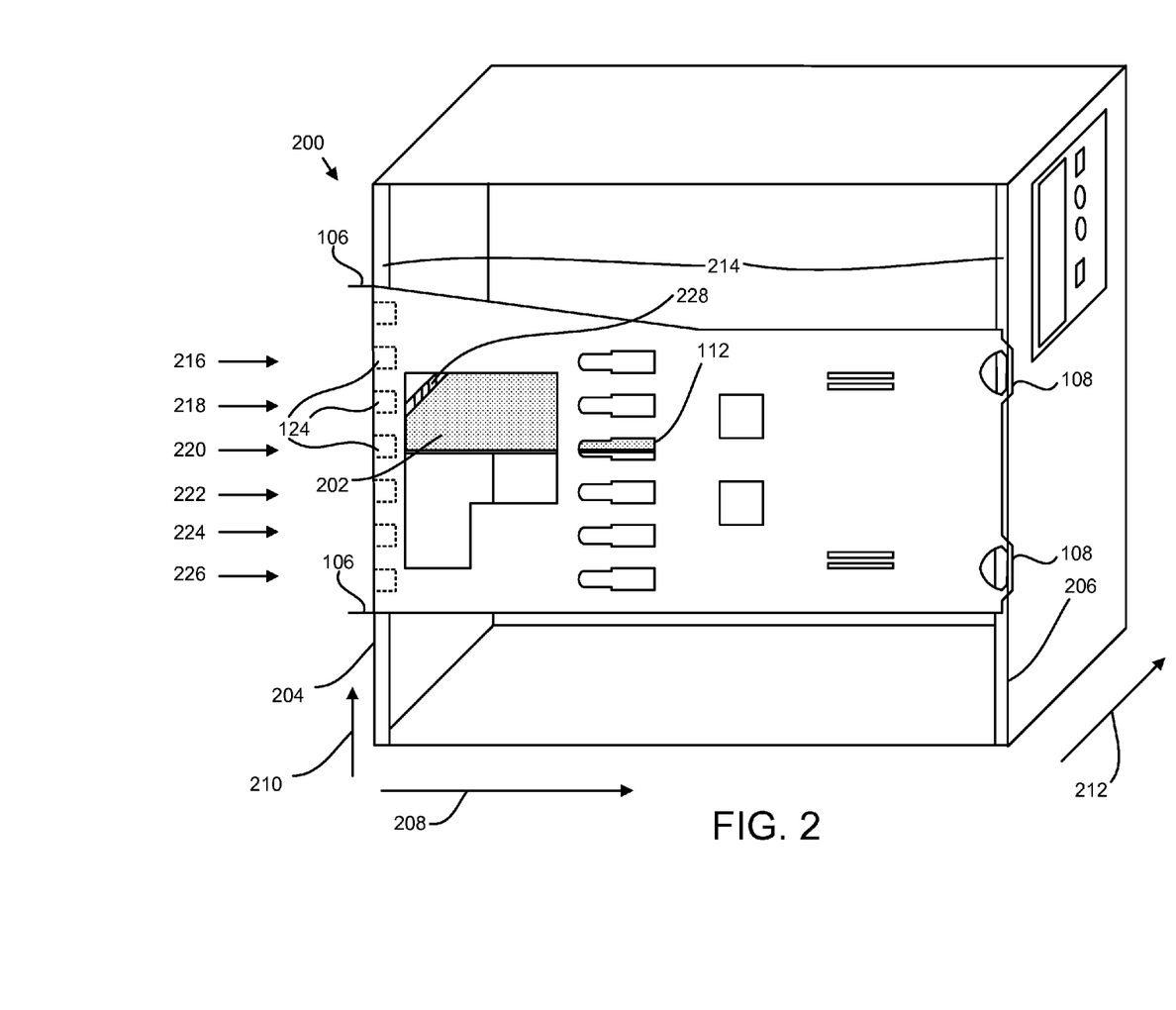
FIG. 2 is a perspective view illustrating one embodiment of a computer chassis with an adapter card retainer bracket installed.

FIG. 1 is a side view illustrating one embodiment of an adapter card retainer bracket 100. The adapter card retainer bracket 100 is a substantially rigid bracket that is configured to attach to a computer chassis to transfer static and dynamic loads from the chassis center area to outside sustaining members and to retain adapter cards in position regardless of adapter card heights. FIG. 2 is a perspective view illustrating one embodiment of a computer chassis 200 with the adapter card retainer bracket 100 attached to it.

In one embodiment, the adapter card retainer bracket 100 is constructed out of metal, metal alloys, or other substantially rigid materials such as rigid plastics. In one embodiment, the adapter card retainer bracket 100 is constructed from the same material as is constructed a computer chassis 200 to which the bracket 100 will be attached. In a further embodiment, the adapter card retainer bracket 100 is substantially planar such that when attached to a computer chassis 200, a cover or other case element fits over the adapter card retainer bracket 100.

The rigidity of the adapter card retainer bracket 100 enables the bracket 100 to span a computer chassis 200 and to transfer loads from the adapter card retainer bracket 100 to the computer chassis 200. For example, during shipping or movement of the computer chassis, a side of the computer chassis 200 may get knocked or struck by an object or force. In a conventional computer chassis, those forces may be transferred to adapter cards or other computer components next to the chassis wall cover which may result in damage to the computer components. The adapter card retainer bracket 100 attaches to the supports 214 of the computer chassis 200 and transfers impact energy from the side of the chassis 200 to the support members 214 so that the computer components within the chassis 200 are protected.

In one embodiment, the adapter retainer bracket 100 includes a first end 102 and a second end 104. In a further embodiment, the first end 102 of the adapter retainer bracket 100 has a first set of attachment devices 106 that are configured to attach the first end 102 of the adapter card retainer bracket 100 to a first side of a chassis 204. In yet a further embodiment, the second end 104 of the adapter retainer bracket 100 also has a second set of attachment devices 108 that are configured to attach the second end 104 of the adapter retainer bracket 100 to a second side 206 of the chassis 200. In one embodiment, the first and second set of attachment devices 106, 108 enable the adapter retainer bracket 100 to be installed flush with the support members 214 of the adapter retainer bracket 100. Thus, a cover over the chassis will not be inhibited by any protrusions or the like from the adapter retainer bracket 100.

In some embodiments, the first and second sets of attachment devices 106, 108 may be the same or similar devices such as u-tabs, clips, fasteners or the like. As depicted, the first set of attachment devices 106 are configured with a pronged hook design that allows a hook to be attached to a rear support member 214 of the chassis while allowing minimum chassis depth and tool-less attachment. (See FIG. 3 and discussion below regarding the pronged hook attachment devices). In such an embodiment, the first set of attachment devices include at least one tab 106 (FIG. 3) extending from the first end of the adapter retainer bracket 100 and configured to engage a receiving slot formed in the first side (rear side) of the chassis.

Similarly, in the depicted embodiment, the second set of attachment devices 108 are configured to attach the second end 104 of the adapter card retainer bracket 100 to the second side 206 of the chassis 200 and may include at least one receptor tab 108 (see FIG. 4) extending from the second end 104 of the adapter card retainer bracket 100. As depicted, the receptor tab 108 is configured to receive at least one flexible protruding tab from the second side 206 of the chassis 200. In a further embodiment, the receptor tab 108 includes at least one edge 110 configured to lockably engage the flexible protruding tab in a fixed position.

Figure 7A:
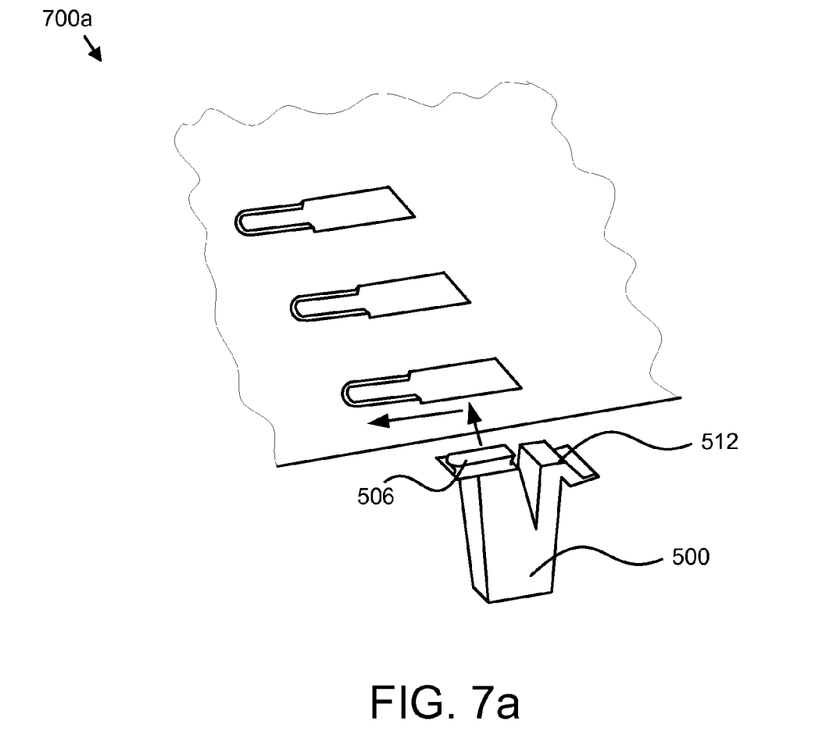
FIG. 7a is a perspective view illustrating one embodiment of an installation procedure for attaching an adapter card retainer plunger to an adapter card retainer bracket.

In one embodiment, the adapter card retainer bracket 100 is formed with a plurality of plunger openings 112 (FIG. 1), wherein each plunger opening 112 is configured to receive a respective adapter card retainer plunger. (See FIG. 7 and the text below for a description of an adapter card retainer plunger). The plunger openings 112 are formed to match a shape of the adapter card retainer plunger. In the depicted embodiment, each plunger opening 112 is formed with a wide side 114 and a narrow side 116. The narrow side 116 is formed to be slightly narrower than the wide side 114 so that an attachment protrusion extending from the adapter card retainer plunger can slidably attach to the narrow side 116 of the opening 112. The wide side 114 may be configured to engage an engagement tab of the adapter card retainer plunger as will be discussed in detail below.

In one embodiment, the narrow side 116 of each of the plunger openings 112 is formed with a tapered edge 702 (FIG. 7a) so that when an attachment protrusion is slid into position, the attachment protrusion is flush with the face of the adapter card retainer bracket 100. Of course, in other embodiments, the plunger openings 112 may be formed in different shapes to accommodate different types of attachment mechanisms.

In one embodiment, the plunger openings 112 are formed in an aligned pattern, as depicted in FIG. 1, and are spaced such that each plunger opening 112 corresponds with a potential adapter card location 216-226 in the chassis 200 when the bracket 100 is attached to the chassis 200. (FIG. 2) Chassis slots are also typically aligned with adapter card locations on a motherboard installed in the chassis 200. A typical motherboard has slots, sometimes called expansion slots, which receive adapter cards 202 such as graphics cards, sound cards, network cards, or the like. The slots are typically spaced on the motherboard according predefined industry standards.

In the depicted embodiment, the plunger openings 112 are configured to align with motherboard expansion slots and chassis slots such that if an adapter card retainer plunger is attached to a plunger opening 112, the plunger will align with an edge of an adapter card 202 as installed in a corresponding expansion slot and chassis slot. An edge of the plunger may contact an edge of the adapter card 202 to prevent movement of the adapter card 202 in a direction away from its corresponding motherboard slot. In this way, the plunger acts to retain the adapter card in a selected expansion slot, regardless of the height of the adapter card even if the chassis experiences significant rattling, knocking, or vibration forces. The plunger size may be adjusted to correspond to different card heights, so that cards of any height allowed by the chassis specification may be retained and protected.

In one embodiment, the adapter card retainer bracket 100 may be formed with one or more exhaust openings 118 configured to exhaust heat from any adapter cards installed within the chassis. In particular, adapter cards such as graphics card adapters may generate excessive heat that, if confined, may result in component failure. The exhaust opening 118 provides a path for heat and exhaust air to escape or expand, thereby reducing pressure buildup, reducing component temperatures, and altering an acoustic profile of the adapter cards. In some embodiments, the exhaust opening 118 allows for various connectors such as scalable link interface ("SLI") connectors which enable to two are more adapter cards to be connected together.

In some embodiments, the adapter card retainer bracket 100 may be formed with one or more cable openings 120 configured to provide a path through the adapter card retainer bracket 100 configured to route cables within the chassis. Particularly in a chassis with smaller dimensions, space for cable routing may be limited, and the depicted openings 120 provide a routing path for cables, including cables to and from adapter cards installed in the chassis. In some embodiments, indentions or depressions (not shown) may be formed into a face of the adapter card retainer bracket 100 to further facilitate the routing of cables within the chassis. In one embodiment, the cable openings 120 and any cable routing channels are formed so that a chassis cover may the adapter card retainer bracket 100 without encountering resistance from any protruding cables or cords.

In one specific embodiment, the adapter card retainer bracket 100 may be formed with a plurality of fan bracket tabs 122 configured to engage and retain a fan bracket within the chassis. The fan bracket tabs 122 are may be formed integrally with the adapter card retainer bracket 100 and are flexible such that when the adapter card retainer bracket 100 is attached to the chassis, the flexible fan bracket tabs apply a retaining force against a fan bracket.

The adapter card retainer bracket 100, in one embodiment, is formed with a plurality of retainer tabs 124 protruding from the first end 102 of the adapter card retainer bracket 100. The retainer tabs 124 are spaced such that each retainer tab 124 corresponds with a potential adapter card location 216-226 in the chassis 200. In one embodiment, each retainer tab 124 is configured to engage an adapter card installation bracket 228. (FIG. 2). As will be recognized by those of skill in the art, adapter cards are typically provided with an adapter card bracket that engages the computer chassis and fills a computer chassis slot opening. Conventionally, the adapter card brackets are secured to the chassis by way of a small screw or fastener.

The retainer tabs 124 allow for tool-less installation of adapter cards 202 as the retainer tabs 124 may act to engage and secure the adapter card brackets 228 to the chassis 200. In one embodiment, the retainer tabs 124 may be used in addition to other securing mechanisms such as screws or the like. In operation, as the adapter card retainer bracket 100 is attached to the chassis 200, the retainer tabs 124 align with and engage an edge of any installed adapter card installation brackets 228. Securing the adapter card retainer bracket 100 in position by way of the first and/or second set of attachment devices 106, 108 also secures any adapter cards 202 and their corresponding brackets 228 into position as well. The result is a tool-less installation and removal of adapter cards 202.

FIG. 2 is simplified for ease of discussion, and in some embodiments, the chassis 200 may be configured to include numerous additional computer components such as a motherboard, a power supply, a hard disk drive, an optical drive, etc. For example, the chassis 200 may house motherboard that is compliant with an Advanced Technology Extended (ATX) form factor, or alternatively, with a Balanced Technology Extended (BTX) form factor. As depicted, an adapter card 202 is configured in the chassis 200, and it aligns with one of the plunger openings 112 formed into the adapter card retainer bracket 100.

The chassis 200 may be designed in different sizes, materials, and configurations, and the adapter card retainer bracket 100 is formed to accommodate the selected size and configuration of the chassis 200. For example, some computer chassis are oriented vertically and some are oriented horizontally. A chassis 200 may be made out of various materials such as steel, aluminum, plastic, or the like. Further, chassis 200 are typically provided in many different sizes known as form factors. Rack-mounted chassis are typically described in terms of rack units or "U" which refer to the height of equipment intended for mounting in the rack. The size of a piece of rack mounted equipment is frequently described in terms of 1 U, 2 U, 3 U, etc., where each U is a multiple of 1.75 inches (4.445 cm) or one rack unit "U".

As depicted, the chassis 200 has a z axis 208 that extends from a first end 204 to a second end 206, and an x axis 210 that is orthogonal to the z axis 208, or from the depicted bottom (may not be the bottom in some configurations) extends to the depicted top of the chassis 200. A y axis 212 that is orthogonal to both the x axis 210 and the z axis 208 defines a width (or thickness) of the chassis 200. In one embodiment, the width of the chassis 200 along the y axis 212 in the range of 12.5 to 13.34 centimeters (4.92 inches to 5.5 inches). The width of the chassis may be selected to minimize its volume while still being able to hold full-size adapter cards and the like. Of course, other design constraints may be considered as well. In a further embodiment, the width is defined in a direction 212 that is substantially orthogonal to the adapter card retainer bracket 100 and parallel to the installed adapter card 202 that is in the range of 12.5 to 13.34 centimeters (4.92 inches to 5.5 inches).

Full-size adapter cards, such as PCI cards, have a height of about 10.67 centimeters (4.2 inches). However, other card sizes are available such as half-height cards or "low-profile cards", which have a height of about 3.61 centimeters (1.42 inches). In one embodiment, the chassis 200 is configured to accept cards of varying heights including both full-size adapter cards and low-profile adapter cards, and the adapter card retainer bracket 100 is configured to simultaneously accommodate the varying card sizes. In the depicted embodiment, the height of the adapter card 202 is measured in the same direction 212 as the width of the chassis 200. For example, the adapter card 202 may be attached to an expansion slot of a motherboard attached vertically to the back wall of the chassis 200. Thus, an adapter card 202 attached to the motherboard would extend in the y direction 212 towards the attached adapter card retainer bracket 100.

In the depicted embodiment, the adapter card retainer bracket 100 is attached to a first end 204 of the chassis 200 and to a second end 206 of the chassis using the first and second sets of attachment devices 106, 108. The adapter card retainer bracket 100 may be configured to conform to specific chassis height requirements along the x axis 210 or z axis 208. For example, the adapter card retainer bracket 100 may be provided with a 1 U, 2 U, 3 U, or other rack unit height as needed.

Figure 3:
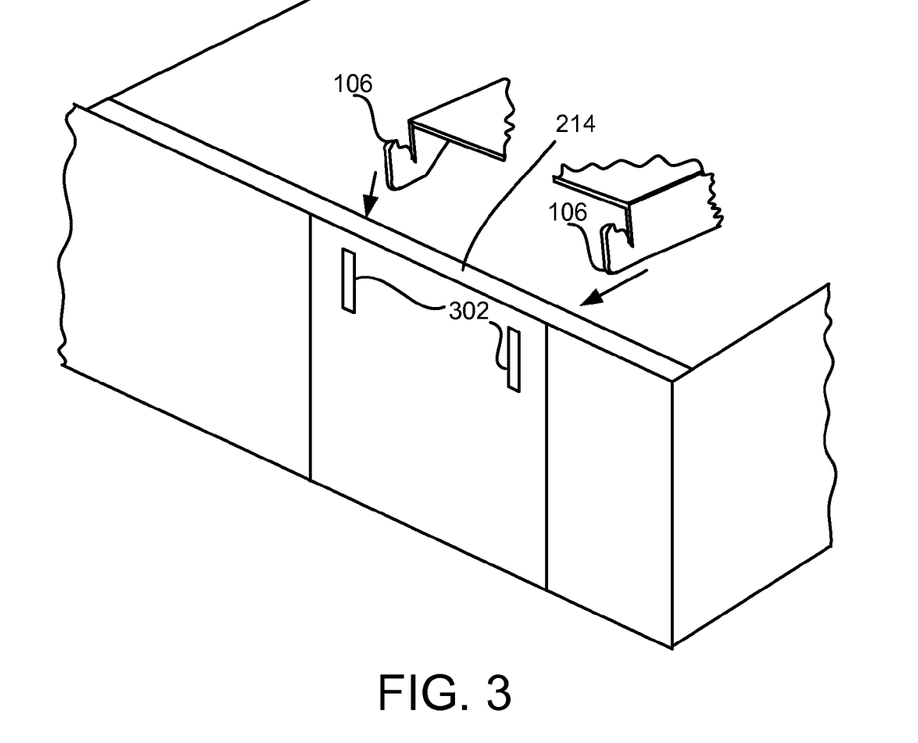
FIG. 3 is a perspective view illustrating one embodiment of an attachment mechanism of a adapter card retainer bracket.

FIG. 3 is a perspective view illustrating one embodiment of the first set of attachment mechanisms 106 of the adapter card retainer bracket 100. As depicted, the chassis 200 has receiving slots 302 formed therein to receive the tabs 106 extending from the first end of the adapter card retainer bracket 100. In this embodiment, the tabs 106 are formed as pronged hooks to tie the adapter card retainer bracket 100 to the chassis 200. The pronged hook tabs 106 slide into the receiving slots 302 to engage the chassis wall or support members 214 thereby increasing the strength of the chassis 200 and enabling loads to be distributed from the adapter card retainer bracket 100 to the chassis 200 support members 214.

Figure 4:
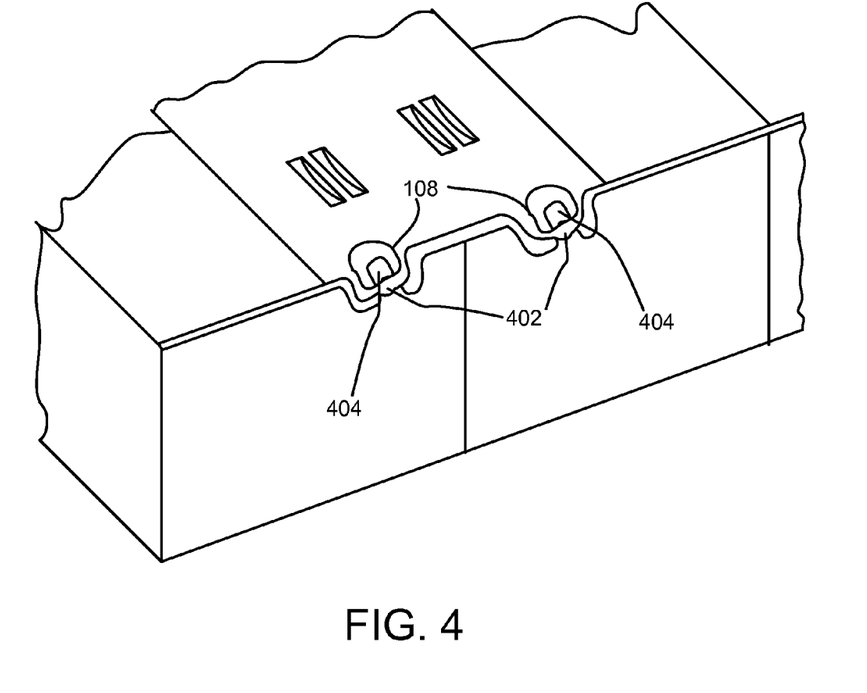
FIG. 4 is a perspective view illustrating one embodiment of another attachment mechanism of a adapter card retainer bracket.

FIG. 4 is a perspective view illustrating one embodiment of another attachment mechanism 108 for attaching an adapter card retainer bracket 100 to the chassis 200. As depicted, the adapter card retainer bracket 100 uses two different types of attachment mechanisms 106, 108. However, it is contemplated that in some embodiments similar attachment mechanisms may be used for both the first end 102 and second end 104 of the adapter card retainer bracket 100. Of course, other types of attachment devices as recognized by those of skill in the art may also be used in various embodiments.

In the depicted embodiment, the attachment devices 108 are configured to attach the second end 104 of the adapter card retainer bracket 100 to the second side 206 of the chassis 200. The attachment devices 108 include a receptor tab 402 extending from the second end 104 of the adapter card retainer bracket 100 and configured to receive a flexible protruding tab 404 from the second side 104 of the chassis 200. In one embodiment, the receptor tab 402 includes at least one edge configured to lockably engage the flexible protruding tab 402 in a fixed position.

In this manner, the adapter card retainer bracket 100 is secured to the chassis 200 in a tool-less fashion. It is contemplated that some embodiments may use additional attachment devices such as screws, bolts, and the like that may require tools for fastening.

Figure 5:
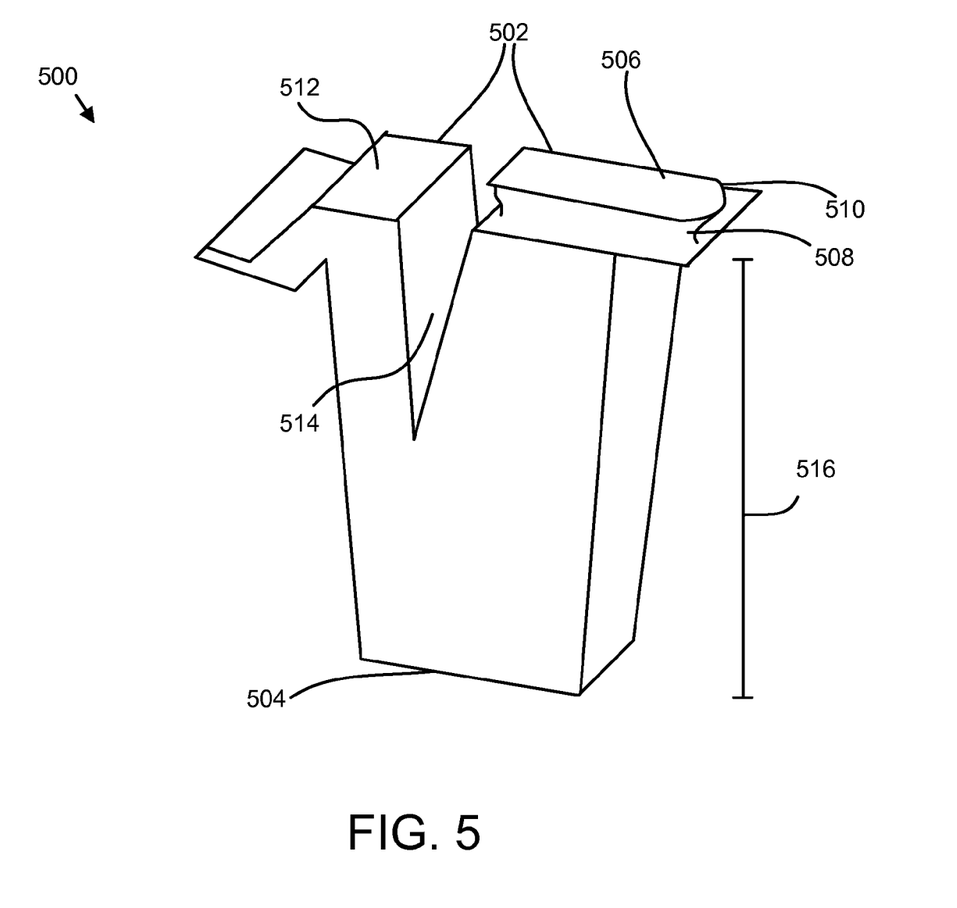
FIG. 5 is a perspective view illustrating one embodiment of an adapter card retainer plunger.

FIG. 5 is a perspective view illustrating one embodiment of an adapter card retainer plunger 500. As depicted, the adapter card retainer plunger 500 has a first edge 502 configured to removably engage a plunger opening 112 (FIG. 1) of the adapter card retainer bracket 100. The adapter card retainer plunger 500 also has a second edge 504 configured to engage an edge of an adapter card 202 within the chassis 200. The second edge 504 may be configured as a flat surface in one embodiment. In other embodiments, the second edge may be configured with indentations or the like that conform to the shape of the adapter card 202 edge. For example, a slot may be formed into the second edge 504 for receiving the adapter card 202.

In some embodiments, the adapter card retainer plunger 500 is made from a material such as plastic, rubber, or the like. The adapter card retainer plunger 500 may be provided in various sizes and shapes to correspond to the plunger openings 112 and to reach a predefined distance from the adapter card retainer bracket 100 to the edge of the adapter card 202. When attached to the installed adapter card retainer bracket 100, the adapter card retainer plunger 500 acts to retain the adapter card 202 into its expansion slot #, by providing a barrier against movement at the edge of the adapter card 202 in a direction away from the expansion slot. In one embodiment, the adapter card retainer plunger 500 is sized to engage an edge of a low-profile adapter card.

In the FIG. 5 embodiment, the adapter card retainer plunger 500 includes an attachment protrusion 506 extending from the first edge 502 of the adapter card retainer plunger 500. The attachment protrusion 506 is configured to slidably attach to a narrow side 116 (FIG. 1) of a plunger opening 112. The attachment protrusion 506 may include a narrow neck portion 508 and a head portion 510, wherein the narrow neck portion 508 is narrower than the head portion 510 of the attachment protrusion 506. This enables the narrow neck portion 508 to slide into the narrow side 116 of a plunger opening 112 to removably retain the adapter card retainer plunger in a substantially fixed position in relation to the adapter card retainer bracket 100.

The adapter card retainer plunger 100, in one embodiment, may include an engagement tab 512 extending from the first edge 502 of the plunger 500. The engagement tab 512 is configured to engage an edge of a wide side 114 (FIG. 1) of the plunger opening 112. In one embodiment, the engagement tab 512 is substantially flexible with respect to the attachment protrusion 506 such that compression of the engagement tab 512 causes a retaining force to be applied to the edge of the wide side 114 of the plunger opening 112 if the adapter card retainer plunger 500 is attached to the adapter card retainer bracket 100. In the depicted embodiment, the engagement tab 512 flexibly moves toward the attachment protrusion 506 to facilitate attachment of the plunger 500 to the adapter card retainer bracket 100.

In one embodiment, the attachment protrusion 506 and engagement tab 512 are configured such that if the adapter card retainer plunger 500 is attached to the adapter card retainer bracket 100, the attachment protrusion 506 and engagement tab 512 are substantially flush with the adapter card retainer bracket 100 surface.

In one embodiment, the first edge 502 of the adapter card retainer plunger 500 is formed with a slit 514 that separates the attachment protrusion 506 and the engagement tab 512. The slit 514 further enables the flexible movement of the engagement tab 512.

As depicted the second edge 504 of the adapter card retainer plunger 500 is opposite the first edge 502 and is configured to reach a predefined distance 516 from the first edge 502 of the adapter card retainer plunger 500. In one embodiment, the predefined distance 516 corresponds to a distance from the adapter card retainer bracket 100 to the edge of the adapter card 202 (FIG. 2). As noted, the adapter card retainer plunger 500 may be formed in different sizes and heights so that adapter cards 202 of different heights may be accommodated.

Figure 6:
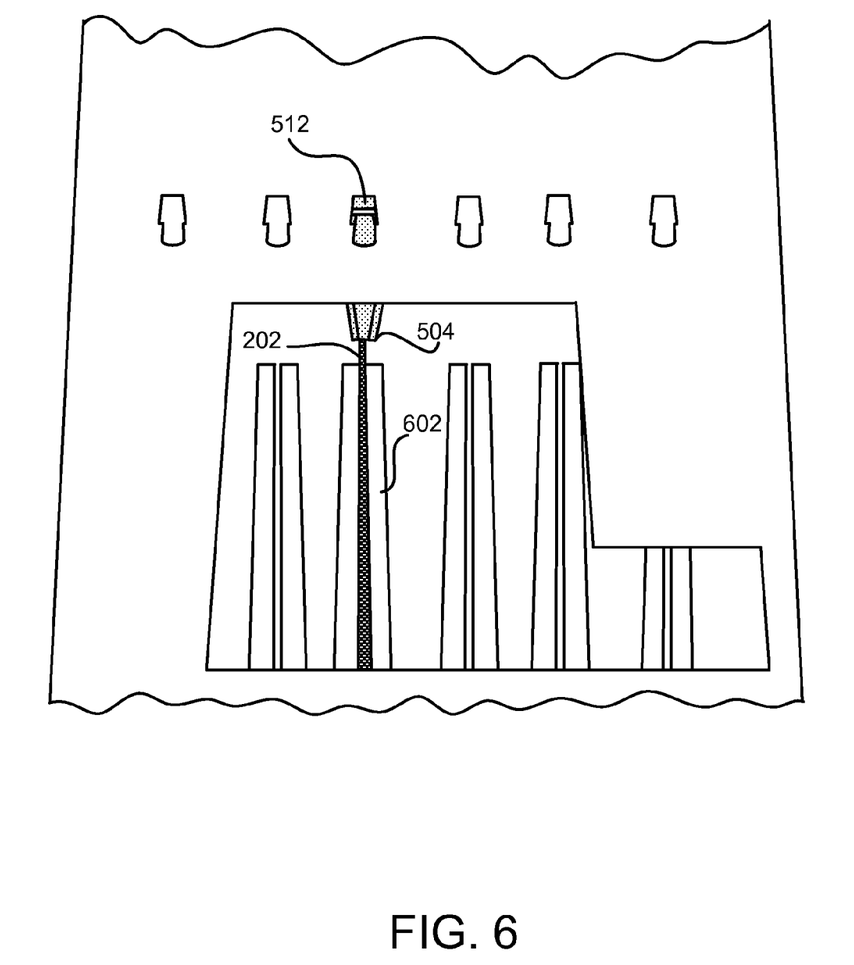
FIG. 6 is a perspective view illustrating one embodiment of an adapter card retainer bracket with an adapter card retainer plunger installed.

FIG. 6 is a perspective view as seen from the left side of FIG. 2 illustrating one embodiment of an adapter card retainer bracket 100 with an adapter card retainer plunger 500 installed. The adapter card retainer plunger 500 is attached to the adapter card retainer bracket 100 and extends (as seen through the exhaust opening 118) to the edge of the adapter card 202. The adapter card 202 is attached to an expansion slot 602 that is aligned with the plunger opening 512 and to second plunger edge 504. The second plunger edge 504 engages and retains the adapter card 202 in the expansion slot 512 by extending from the adapter card retainer bracket 100 into the chassis 200 a certain distance 516 to engage the edge of the adapter card 202. Thus, even if the adapter card 202 is a low-profile adapter card or the like, it is retained in position by the adapter card retainer plunger 500 extending into the chassis 200 in a direction illustrated as downward in FIG. 6.

FIG. 7a is a perspective view illustrating one embodiment of an installation procedure 700a for attaching an adapter card retainer plunger 500 to an adapter card retainer bracket 100. As depicted, the attachment protrusion 506 is placed into the wide side 114 of the plunger opening 112, and then is slid into the narrow side 116 of the plunger opening 112. The engagement tab 112 is then compressed and placed into the wide side 116 of the plunger opening 112 to engage the edge of the plunger opening 112. The compression of the engagement tab 512 results in a retaining force being applied to the edge of the plunger opening 112. In this manner, the depicted plunger 500 is securely attached to the adapter card retainer bracket 100.

Figure 7B:
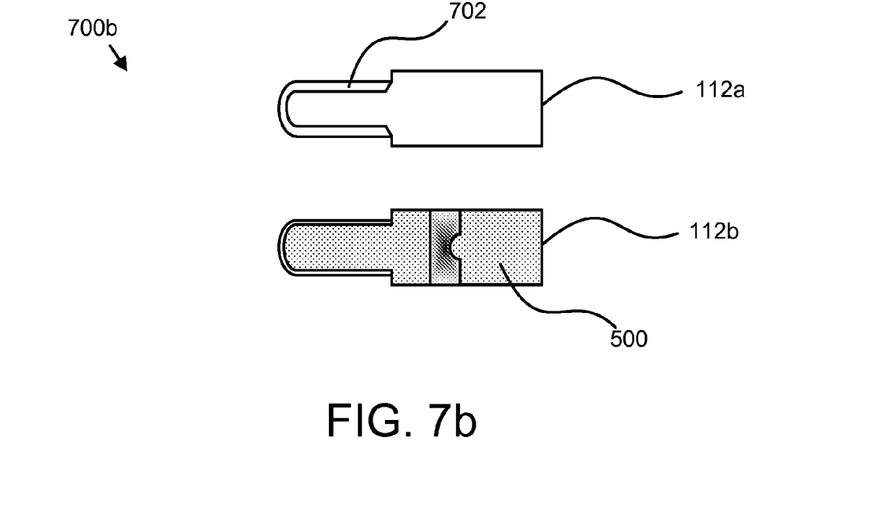
FIG. 7b is a top view of a plunger opening configured to receive an adapter card retainer plunger.

FIG. 7b is a top view of a plunger opening 112a configured to receive an adapter card retainer plunger 500. As depicted the plunger opening 112a shows the plunger opening 112a with a tapered edge 702 around the narrow side 116 of the opening. The plunger opening 112b shows the plunger opening 112b with the adapter card retainer plunger 500 installed therein.

Figure 8A:
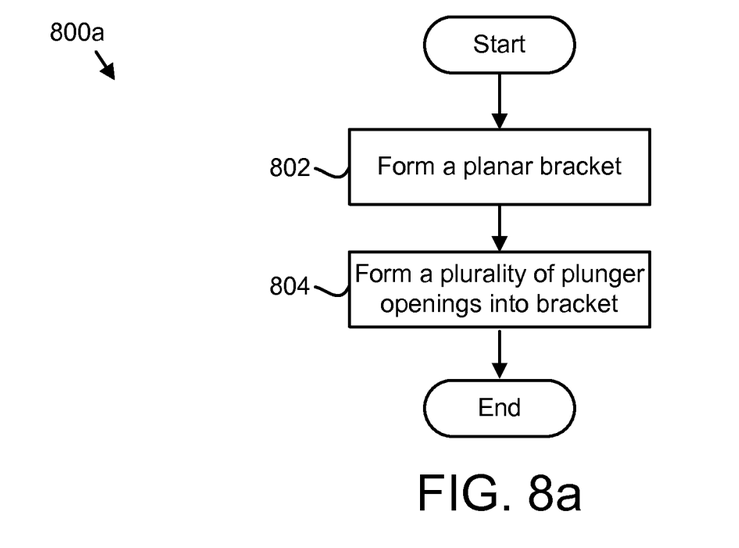
FIG. 8a is a schematic flow chart diagram illustrating one embodiment of a method for forming an adapter card retainer bracket.
Figure 8B:
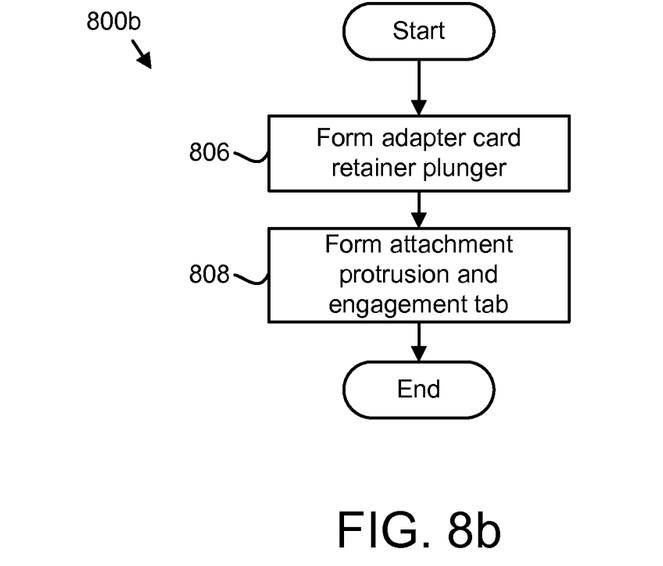
FIG. 8b is schematic flow chart diagram illustrating one embodiment of a method for forming an adapter card retainer plunger.

The schematic flow chart diagrams of FIGS. 8a, 8b are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 8a is a schematic flow chart diagram illustrating one embodiment of a method 800a for forming an adapter card retainer bracket 100. The method begins by forming 802a planar bracket. Next, a plurality of plunger openings 112 is formed 804 into the bracket 100. In one embodiment, the forming 802, 804 of the bracket 100 and the openings is performed simultaneously.

The method 800a may also include steps for forming the adapter retainer card bracket 100 described above including the various disclosed embodiments and implementations. For example, the method 800a may include forming a first end 102 and a second end 104, the first end 102 having a first set of attachment devices 106 configured to attach the first end 102 of the bracket 100 to a first side 204 of a chassis 200. The second end 104 is formed with a second set of attachment devices 108 configured to attach the second end 104 of bracket 100 to a second side 206 of the chassis 200.

In one embodiment, the first set of attachment devices 106 are formed with at least one tab 106 extending from the first end 102 of the adapter card retainer bracket 100 and configured to engage a receiving slot 302 formed in the first side 204 of the chassis 200. The second set of attachment devices 108 may include at least one receptor tab 402 extending from the second end 104 of the adapter card retainer bracket 100 and configured to receive at least one flexible protruding tab 404 from the second side 206 of the chassis 200. The receptor tab 402 may include at least one edge configured to lockably engage the flexible protruding tab 404 in a fixed position FIG. 8b is schematic flow chart diagram illustrating one embodiment of a method 800 for forming an adapter card retainer plunger 500. [This paragraph essentially summarizes a *manufacturing* process but the following sentence summarizes an *operational* process.]

The method 800b substantially includes the steps to carry out the functions presented above with respect to the operation of the described adapter card retainer bracket 100 and adapter card retainer plunger 500. In one embodiment, the method 800b begins by forming 806 an adapter card retainer plunger 500 having a first edge 502 that is configured to removably attach to a plunger opening 112 of an adapter card retainer bracket 100. The adapter card retainer plunger 500 is formed 806 with a second edge 504 configured to engage an edge of an adapter card 202 within a chassis 202 to securely maintain the adapter card 202 in a fixed position with respect to the chassis 200.

Forming 806 the adapter card retainer plunger 500 may include forming 808 an attachment protrusion 506 extending from the first edge 502 of the adapter card retainer plunger 500 and configured to slidably attach to a narrow side 116 of the plunger opening 112 of the adapter card retainer bracket 100. In one embodiment, the attachment protrusion 506 is formed 808 with a narrow neck portion 508 and a head portion 510, wherein the narrow neck portion 508 is narrower than the head portion 510 of the attachment protrusion 506.

Forming 806 the adapter card retainer plunger 500 may also include forming an engagement tab 512 extending from the first edge 502 of the adapter card retainer plunger 500 configured to engage an edge of a wide side 114 of the plunger opening 112. In one embodiment, the engagement tab 512 aligns with the attachment protrusion 506.

In operation, the adapter card retainer plunger 500 may be attached to the adapter card retainer bracket 100 formed in the method 800a. The adapter card retainer bracket 100 may then be attached to the chassis 200 to retain adapter cards 202 of all sizes, to distribute loads from the adapter card retainer bracket 100 to the support members of the chassis 200, and to provide additional structural support to the chassis.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an adapter card retainer bracket comprising a first end and a second end removably attachable to a chassis, and formed with a plurality of plunger openings, each plunger opening comprising a wide side and a narrow side, wherein an attachment protrusion extending from an adapter card retainer plunger of a respective adapter card passes through the wide side and slidably engages the narrow side of the plunger opening along a narrow neck portion of the attachment protrusion between a head portion of the attachment protrusion and a first edge of the adapter card retainer plunger, and an engagement tab of the respective adapter card retainer plunger is compressed to flexibly move towards the attachment protrusion, pass through the wide side of the plunger opening, and apply a retaining force to an edge of the wide side of the plunger opening;
a first set of attachment devices configured to attach the first end of the adapter card retainer bracket to a first side of the chassis; and
a second set of attachment devices configured to attach the second end of the adapter card retainer bracket to a second side of the chassis.

2. The apparatus of claim 1, wherein the first set of attachment devices comprises at least one tab extending from the first end of the adapter card retainer bracket and configured to engage a receiving slot formed in the first side of the chassis.

3. The apparatus of claim 1, wherein the plurality of plunger openings are formed in an aligned pattern on the adapter card retainer bracket and spaced such that each plunger opening corresponds with a potential adapter card location in the chassis if the bracket is installed in the chassis.

4. The apparatus of claim 1, wherein the adapter card retainer bracket further comprises at least one exhaust opening configured to exhaust heat from one or more adapter cards installed within the chassis.

5. The apparatus of claim 1, wherein the adapter card retainer bracket further comprises at least one cable opening configured to provide a path through the adapter card retainer bracket configured to route cables within the chassis.

6. The apparatus of claim 1, further comprising a plurality of retainer tabs protruding from the first end of the adapter card retainer bracket, the plurality of retainer tabs spaced such that each retainer tab corresponds with a potential adapter card location in the chassis, each retainer tab configured to engage an adapter card installation bracket.

7. The apparatus of claim 1, further comprising a set of fan bracket tabs formed integrally with an inner face of the adapter card retainer bracket and configured to engage and retain a fan bracket within the chassis.

8. The apparatus of claim 1, wherein an outer face of the adapter card retainer bracket is configured to be substantially flush with an interior surface of the chassis if the adapter retainer bracket is attached to the chassis.

9. The apparatus of claim 1, wherein the narrow side of each of the plurality of plunger openings is formed with a tapered edge.

10. The apparatus of claim 1, the adapter card retainer plunger comprising a second edge configured to engage an edge of an adapter card within the chassis.

11. The apparatus of claim 10, wherein the second edge of the adapter card retainer plunger is configured to engage an edge of a low-profile adapter card.

12. The apparatus of claim 11, wherein the attachment protrusion extends from the first edge of the adapter card retainer plunger, the attachment protrusion comprising the narrow neck portion connected to the head portion, wherein the narrow neck portion is narrower than the head portion.

13. The apparatus of claim 12, wherein the engagement tab extends from the first edge of the adapter card retainer plunger and engages the edge of the wide side of the plunger opening.

14. The apparatus of claim 13, wherein the engagement tab is substantially flexible with respect to the attachment protrusion.

15. The apparatus of claim 14, wherein the attachment protrusion and engagement tab are configured such that if the adapter card retainer plunger is attached to the adapter card retainer bracket, the attachment protrusion and engagement tab are substantially flush with the adapter card retainer bracket.

16. A method comprising:
forming an adapter card retainer bracket having a plurality of plunger openings and comprising a first end and a second end and configured to be removably attachable to a chassis, wherein each plunger opening comprises a wide side and a narrow side, and an attachment protrusion extending from an adapter card retainer plunger of a respective adapter card passes through the wide side and slidably engages the narrow side of the plunger opening along a narrow neck portion of the attachment protrusion between a head portion of the attachment protrusion and a first edge of the adapter card retainer plunger, and an engagement tab of the respective adapter card retainer plunger is compressed to flexibly move towards the attachment protrusion, pass through the wide side of the plunger opening, and apply a retaining force to an edge of the wide side of the plunger opening;
forming a first set of attachment devices at the first end, the first set of attachment devices configured to attach the first end of the adapter card retainer bracket to a first side of the chassis; and
forming a second set of attachment devices at the second end, the second set of attachment devices configured to attach the second end of the adapter card retainer bracket to a second side of the chassis.

17. The method of claim 16, wherein the first set of attachment devices comprises at least one tab extending from the first end of the adapter card retainer bracket and configured to engage a receiving slot formed in the first side of the chassis.

18. A system comprising:
a computer chassis;
an adapter card installed in the chassis;
an adapter card retainer bracket comprising a first end and a second end, removably attachable to the chassis, and formed with a plurality of plunger openings, each plunger opening comprising a wide side and a narrow side, wherein an attachment protrusion extending from an adapter card retainer plunger of a respective adapter card passes through the wide side and slidably engages the narrow side of the plunger opening along a narrow neck portion of the attachment protrusion between a head portion of the attachment protrusion and a first edge of the adapter card retainer plunger, and an engagement tab of the respective adapter card retainer plunger is compressed to flexibly move towards the attachment protrusion, pass through the wide side of the plunger opening, and apply a retaining force to an edge of the wide side of the plunger opening;
a first set of attachment devices configured to attach the first end of the adapter card retainer bracket to a first side of the chassis; and
a second set of attachment devices configured to attach the second end of the adapter card retainer bracket to a second side of the chassis.

19. The system of claim 18, the adapter card retainer plunger comprising a second edge configured to engage an edge of an adapter card within the chassis.

20. The system of claim 19, the first set of attachment devices comprising at least one tab extending from the first end of the adapter card retainer bracket and configured to engage a receiving slot formed in the first side of the chassis.

21. The system of claim 18, wherein the chassis has a width defined in a direction substantially orthogonal to the adapter card retainer bracket and parallel to the installed adapter card that is in the range of 12.5 to 13.34 centimeters.

* * * * *